(12) United States Patent
Gasparik et al.

(10) Patent No.: US 6,647,027 B1
(45) Date of Patent: Nov. 11, 2003

(54) METHOD AND APPARATUS FOR MULTI-CHANNEL DATA DELAY EQUALIZATION

(75) Inventors: Frank Gasparik, Monument, CO (US); Paul J. Smith, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/437,454

(22) Filed: Nov. 10, 1999

(51) Int. Cl.[7] ............................... G06F 1/04; H04J 3/16
(52) U.S. Cl. ........................................ 370/519; 375/371
(58) Field of Search ................................ 370/516, 517, 370/518, 519, 503, 507; 375/354, 356, 371–373; 713/500, 501, 502, 503, 600, 601; 327/141, 151, 156, 160

(56) References Cited

U.S. PATENT DOCUMENTS

| | | | |
|---|---|---|---|
| 5,018,169 A | | 5/1991 | Wong et al. |
| 5,459,402 A | | 10/1995 | Ueno |
| 5,544,203 A | * | 8/1996 | Casasanta et al. .......... 375/376 |
| 5,808,494 A | | 9/1998 | Chang et al. |
| 5,841,307 A | | 11/1998 | Yamazaki |
| 5,878,097 A | * | 3/1999 | Hase et al. ................. 375/371 |
| 5,931,952 A | * | 8/1999 | Lesmeister .................. 713/400 |
| 5,969,631 A | * | 10/1999 | Ammler et al. ............. 370/503 |
| 6,025,745 A | | 2/2000 | Lee et al. |
| 6,031,847 A | * | 2/2000 | Collins et al. .............. 370/517 |
| 6,084,930 A | * | 7/2000 | Dinteman ................... 375/354 |
| 6,101,197 A | * | 8/2000 | Keeth et al. ................ 370/517 |
| 6,157,231 A | | 12/2000 | Wasson |
| 6,218,880 B1 | | 4/2001 | Relph |
| 6,266,384 B1 | * | 7/2001 | Acampora et al. .......... 375/363 |
| 6,268,753 B1 | | 7/2001 | Sandusky |
| 6,275,550 B1 | * | 8/2001 | Fukuda ....................... 375/357 |
| 6,316,980 B1 | * | 11/2001 | Vogt et al. .................. 327/273 |
| 6,359,910 B1 | * | 3/2002 | Takahashi ................... 370/535 |
| 6,415,325 B1 | * | 7/2002 | Morrien ...................... 709/230 |
| 6,426,958 B1 | * | 7/2002 | Crossett et al. ............. 370/466 |
| 6,470,026 B1 | * | 10/2002 | Pearson et al. ............. 370/503 |
| 6,526,519 B1 | * | 2/2003 | Cuthbert .................... 713/503 |
| 6,560,716 B1 | * | 5/2003 | Gasparik et al. ........... 713/600 |

* cited by examiner

*Primary Examiner*—Chau Nguyen
*Assistant Examiner*—Soon-Dong Hyun
(74) *Attorney, Agent, or Firm*—Carstens, Yee & Cahoon LLP

(57) ABSTRACT

A method and apparatus for managing transmission of data signals in a plurality of data lines. Data signals are received on the data lines and a reference signal. On each of the data lines, a delay between the data signal and the reference signal is measured to form a plurality of delay measurements. A set of delay values from the delay measurements is generated. In a preferred embodiment of the present invention, the delay values are selected to equalize the delay in each of the data lines to have the same delay as the data line having the longest delay. The delay values are used to adjust delay in a transmission in each of the plurality of data signals in the data lines. In the preferred embodiment of the present invention, the reference signal is set such that transitions for the data signals are centered to the middle of a pulse for the reference signal.

66 Claims, 11 Drawing Sheets

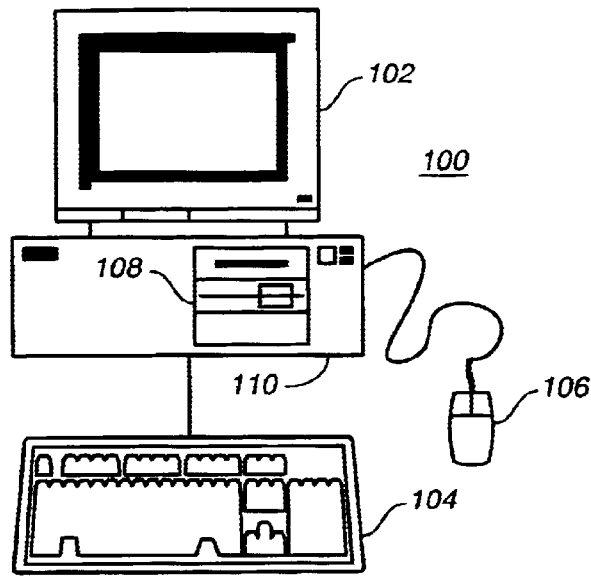
FIG._1
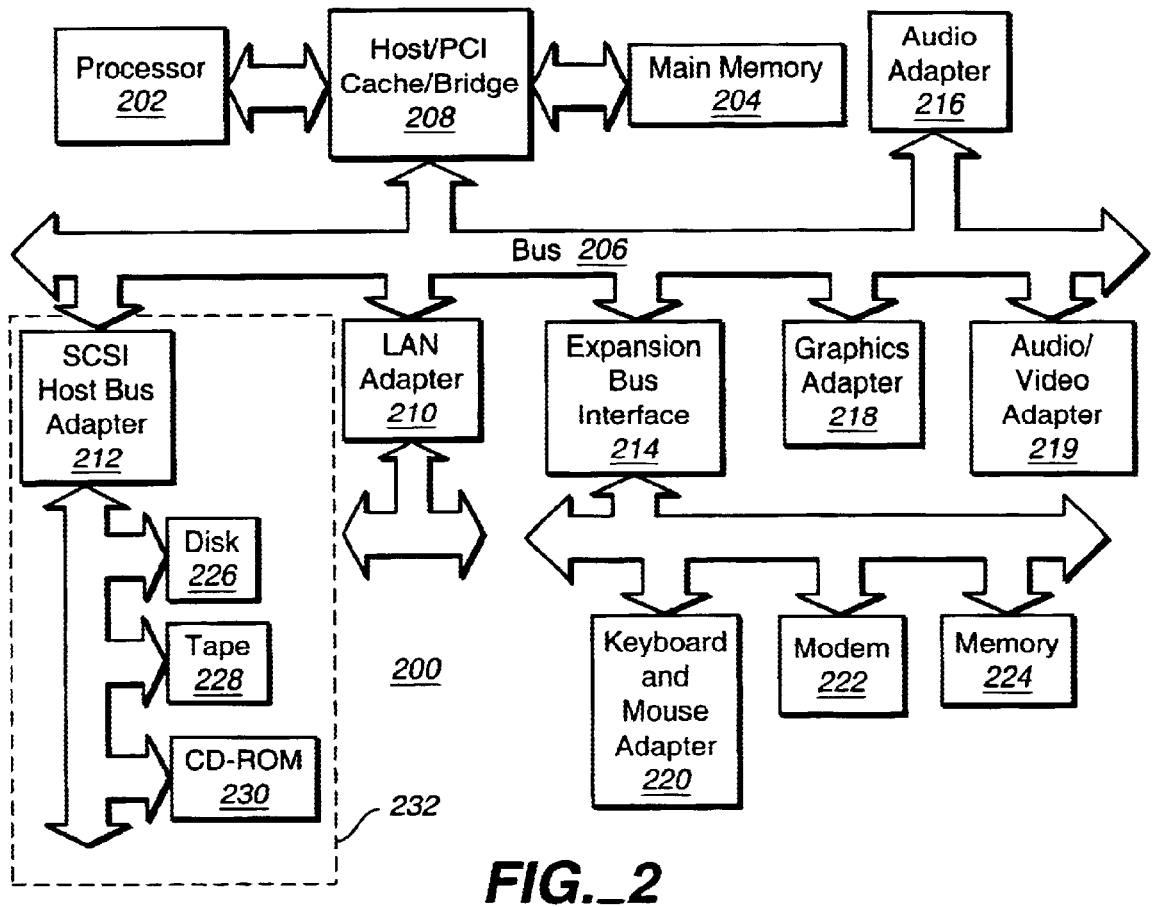
FIG._2

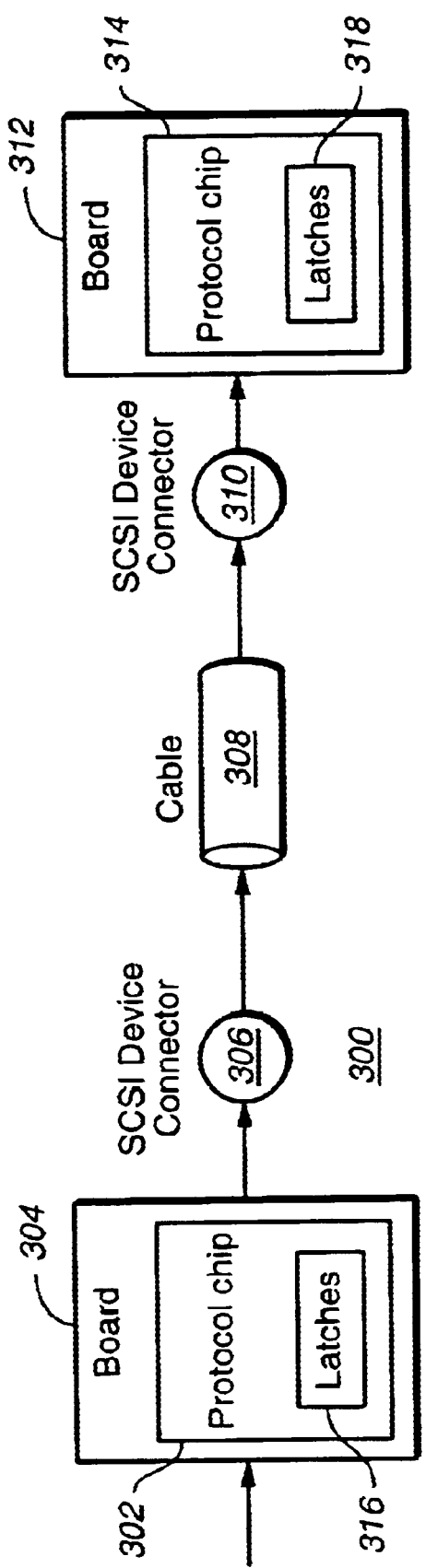
FIG._3

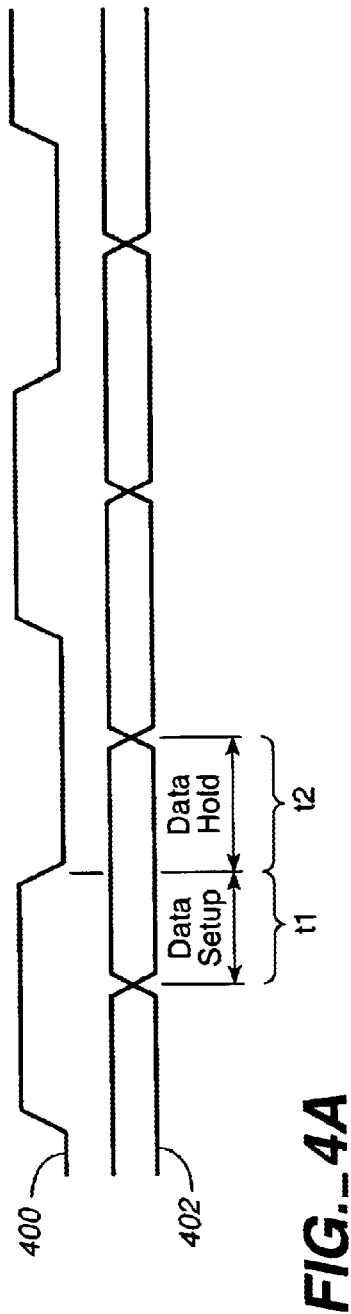
FIG._4A
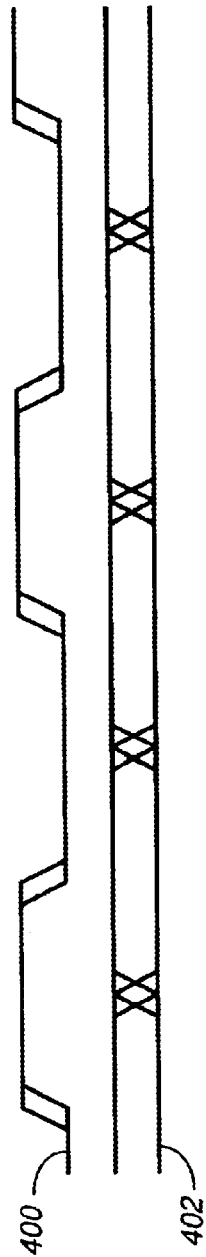
FIG._4B

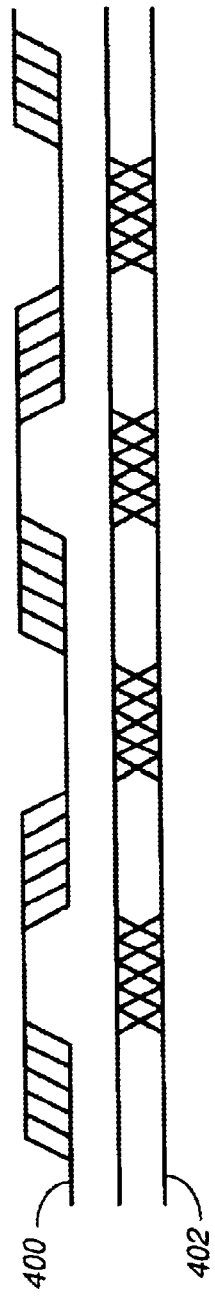
FIG._4C
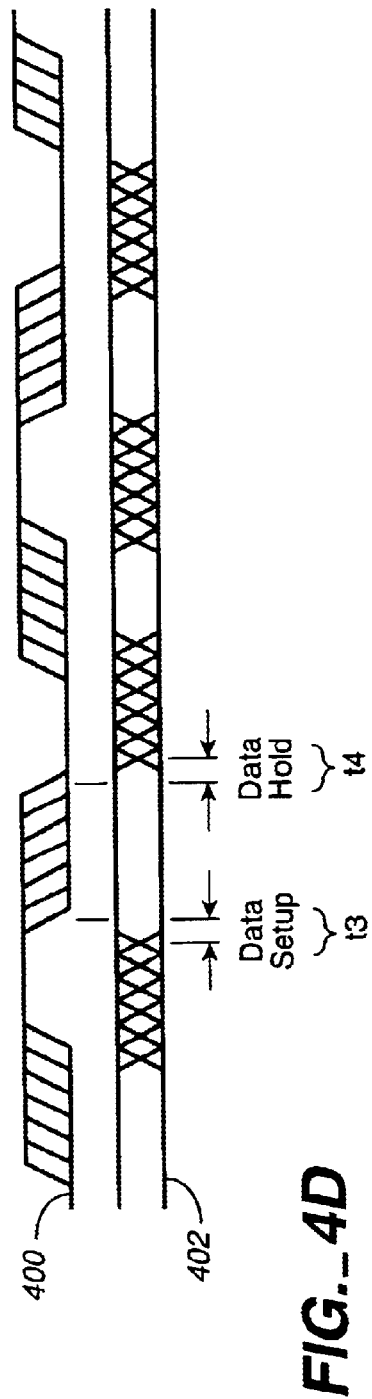
FIG._4D

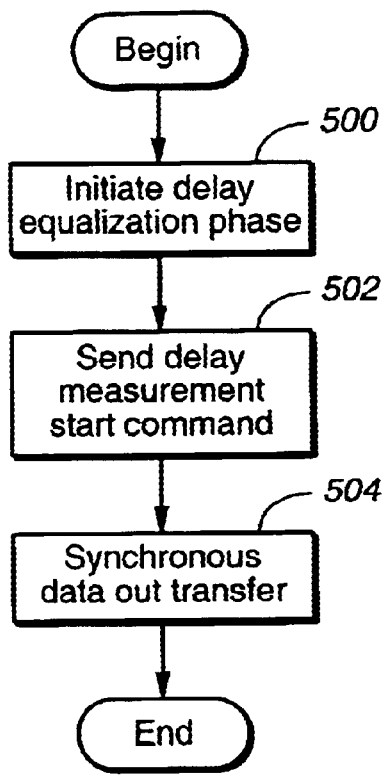
FIG._5
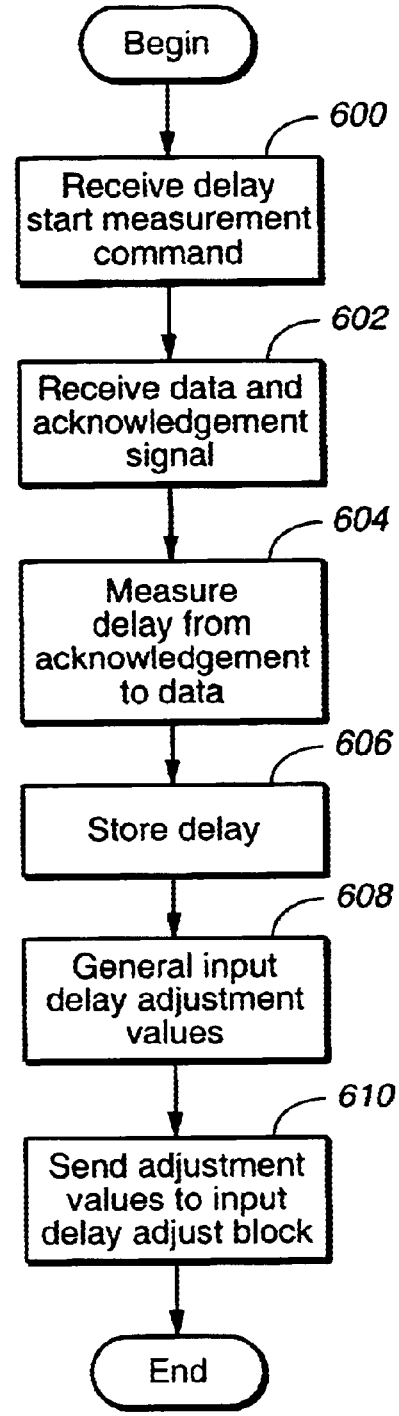
FIG._6

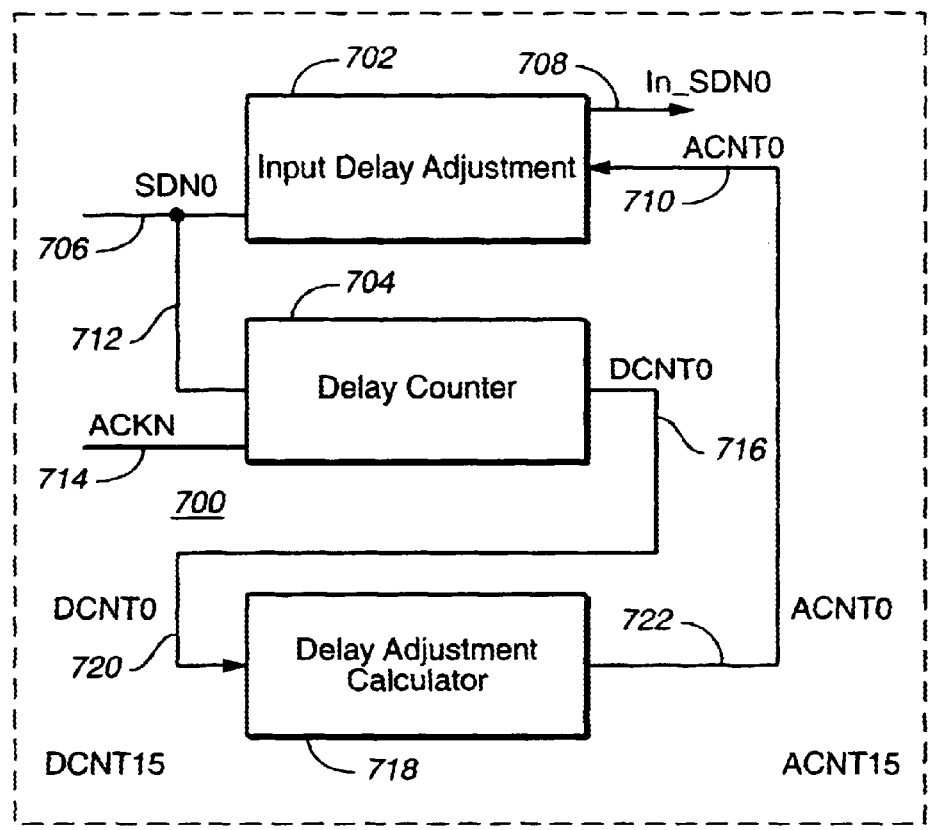
FIG._7
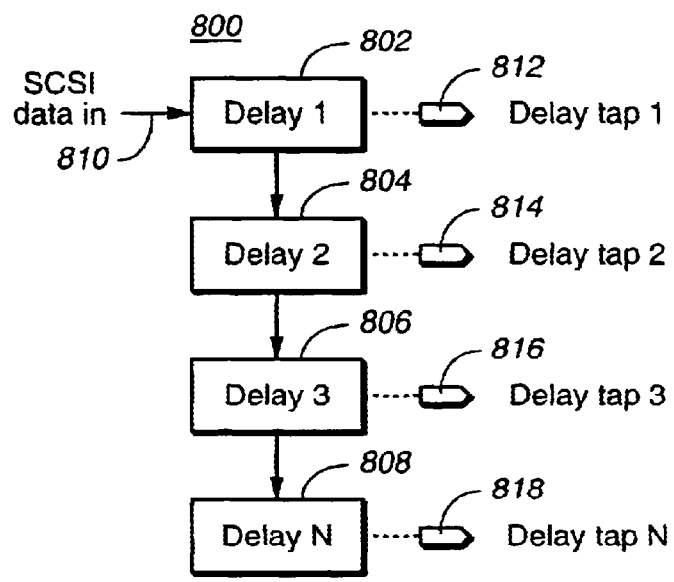
FIG._8

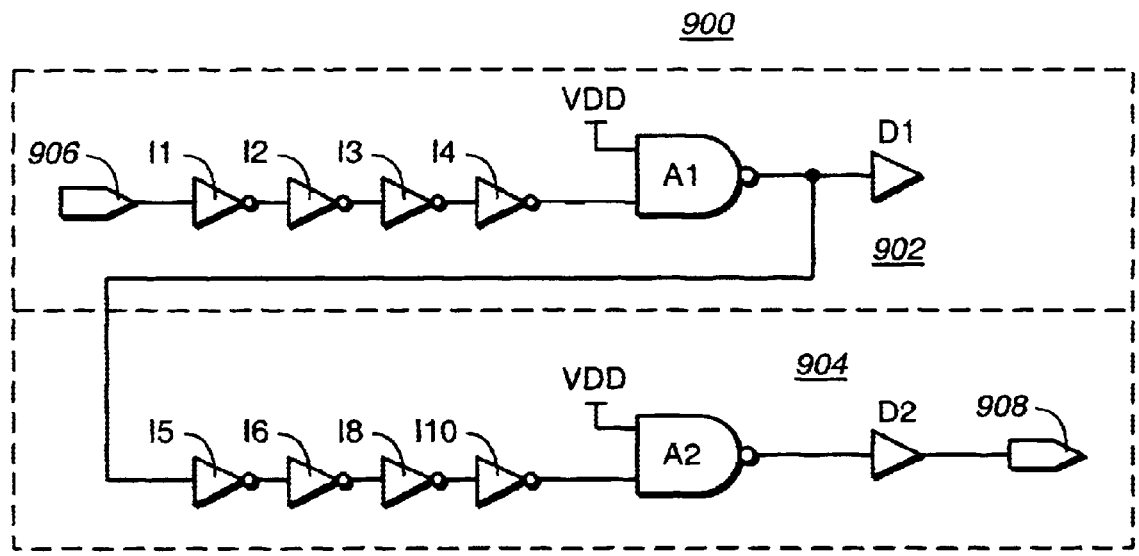
FIG._9
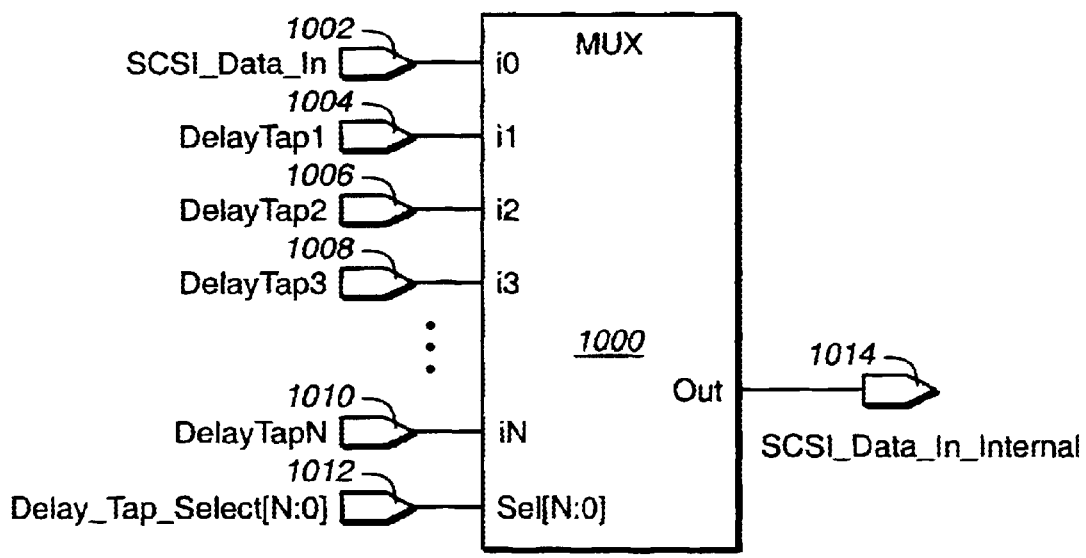
FIG._10

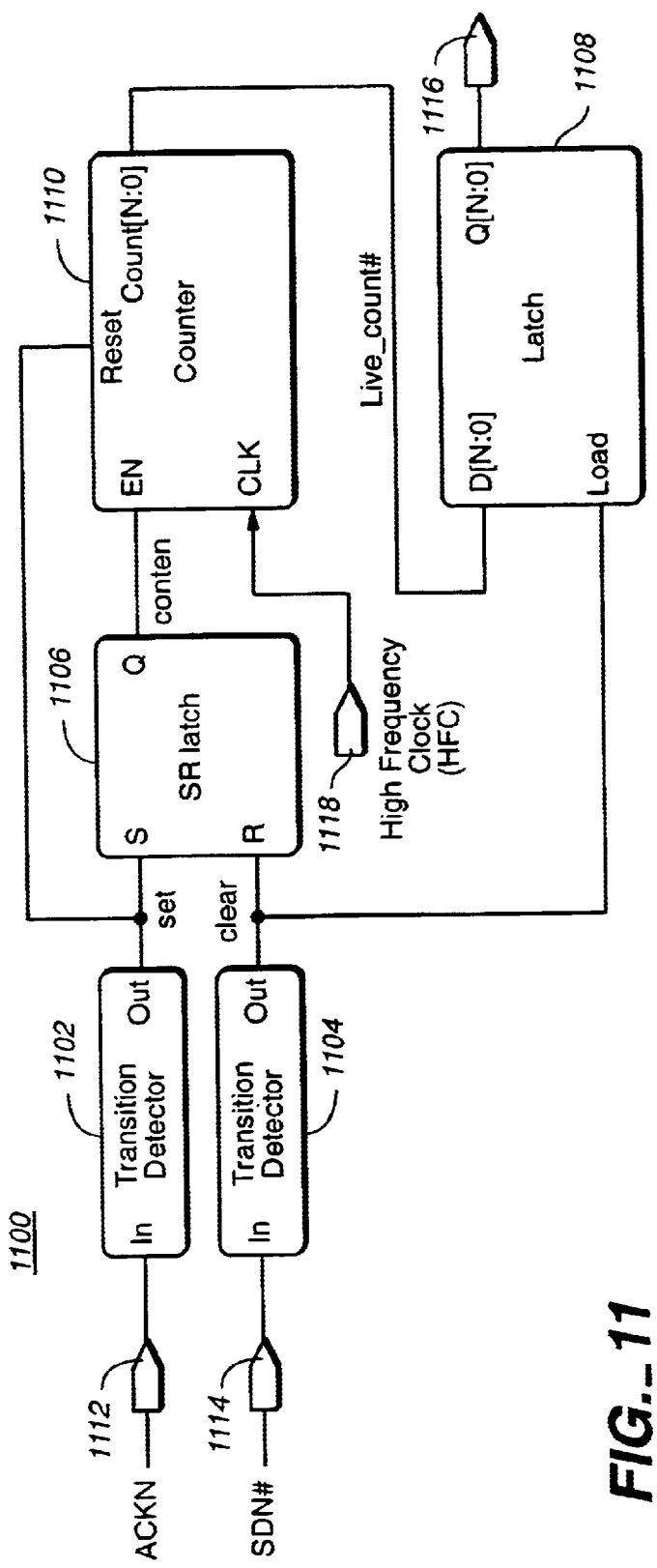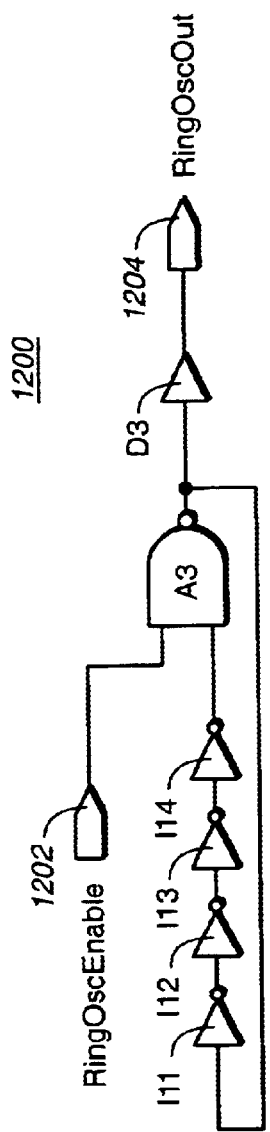
FIG._11
FIG._12

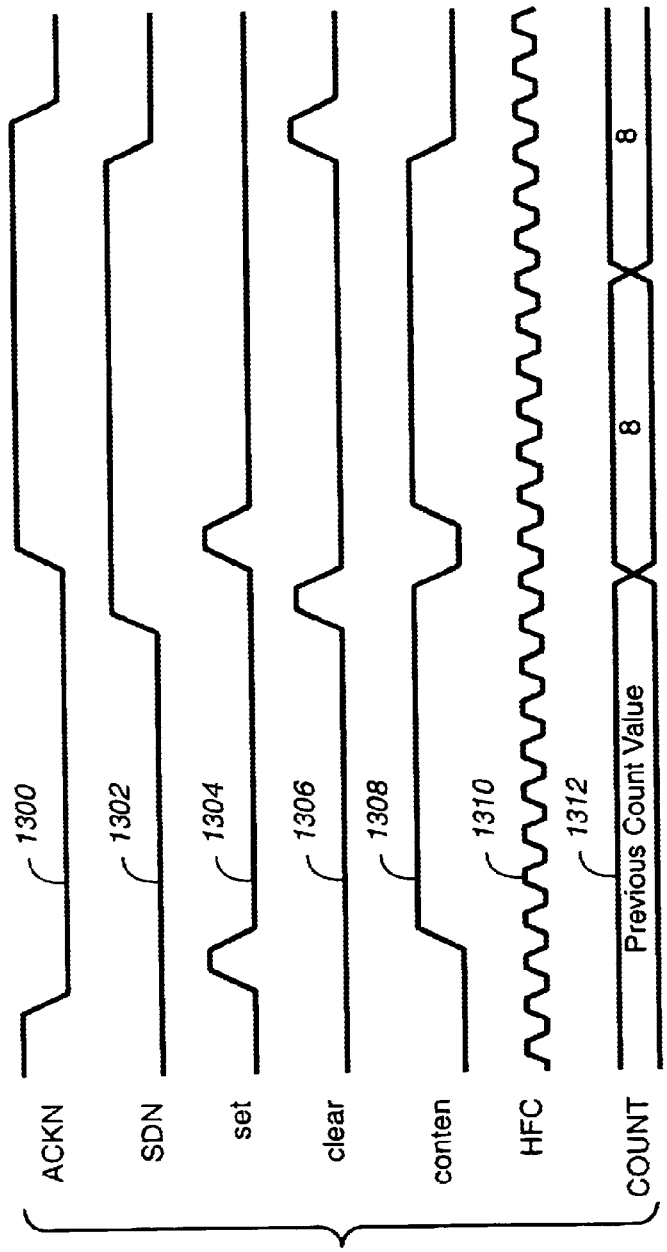
FIG._13
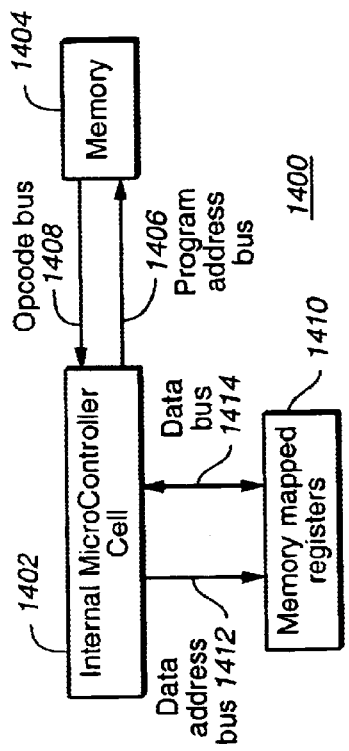
FIG._14

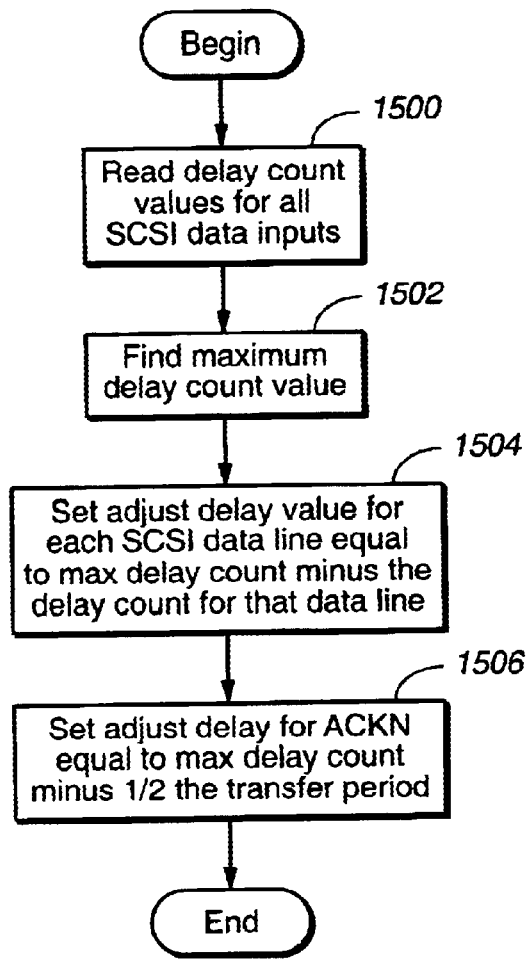
| Pin | COUNT DELAY (DCNT#) | Delay Adjustment (ACNT#) |
|---|---|---|
| SDN0 | 4 | +5 |
| SDN1 | 5 | +4 |
| SDN2 | 3 | +6 |
| SDN3 | 8 | +1 |
| SDN4 | 6 | +3 |
| SDN5 | 4 | +5 |
| SDN6 | 6 | +3 |
| SDN7 | 3 | +6 |
| SDP0 | 7 | +2 |
| SDN8 | 8 | +1 |
| SDN9 | 5 | +4 |
| SDN10 | 2 | +7 |
| SDN11 | 6 | +3 |
| SDN12 | 8 | +1 |
| SDN13 | 7 | +2 |
| SDN14 | 9 | - |
| SDN15 | 2 | +7 |
| SDP1 | 4 | +5 |
| ACKN | 0 | +4 |
FIG._15    FIG._16

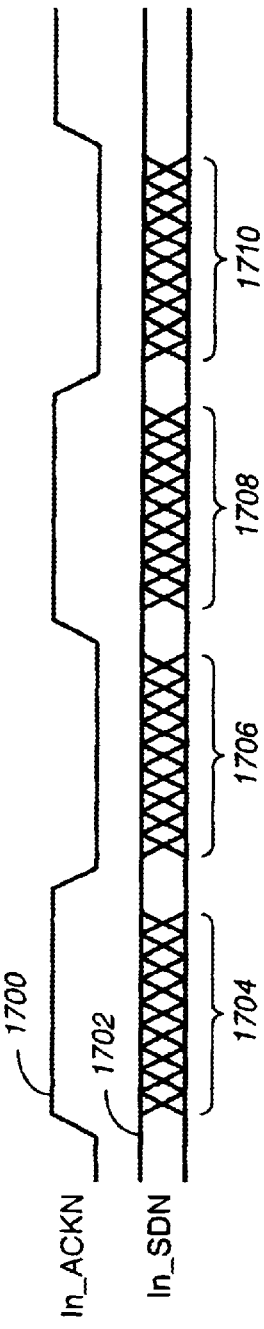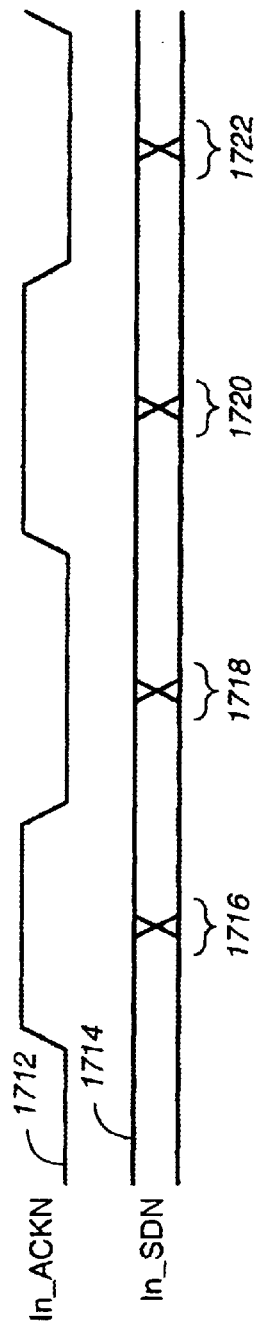

METHOD AND APPARATUS FOR MULTI-CHANNEL DATA DELAY EQUALIZATION

CROSS REFERENCE TO RELATED APPLICATIONS

The present invention is related to application entitled METHOD AND APPARATUS FOR A DUAL PURPOSE PROPAGATION DELAY-TIME CALIBRATION ELEMENT, Ser. No. 09/437,464, now U.S. Pat. No. 6,560,716; which is filed even date hereof, assigned to the same assignee, and incorporated herein by reference.

BACKGROUND OF THE INVENTION

1. Technical Field

The present invention relates generally to electrical circuitry and in particular to a method and apparatus for managing timing of electrical signals. Still more particularly, the present invention relates to a method and apparatus for equalizing delays in parallel data transmissions.

2. Description of the Related Art

In many computer systems, small computer system interface (SCSI) buses are used as an architecture for data transfer within a computer. Previous standards for SCSI contain data transfer rates that were slow relative to data propagation skews. Timing budgets for SCSI devices and transfer mediums were generous in these previous standards. These timing budgets were generous in that the normal design and layout techniques taken and device designed, board layout, and cable routing allowed for these timings to be met. With each progressive generation in the SCSI standard, the data skewed became a larger percentage of the transfer. The largest delay in these designs are due to physical transmission lines in parallel SCSI systems. Each of these transmission lines may have different delays in which pulses or signals will arrive at different times in response to the signals being sent simultaneously.

As the data transfer rates increase in the parallel systems, the variation in propagation delays among the different parallel data channels increase. The delays are also referred to as "skew". This variation at some point becomes too large with respect to the data transfer, thus limiting data transfer rates.

In Table 1, set up and hold timings for single transition data transfers are illustrated for different SCSI standards. Table 2 illustrates set up and hold timings for dual transition data transfers for different SCSI standards. All of the times are in nanoseconds in these tables.

TABLE 1

Single Transition

| Standard | Total Budget (½ period) | Delay At Chip Output | Chip Skew | Board Skew | Budget At Connector | Cable Skew | Budget At Connector | Board Skew | Final | |
|---|---|---|---|---|---|---|---|---|---|---|
| Fast-5  | 100  | 76 | 24  | 1    | 23   | 8   | 15   | 1    | 14   | Min Setup |
| Fast-5  | 100  | 46 | 54  |      | 53   | 28  | 25   |      | 24   | Hold |
| Fast-10 | 50   | 26 | 24  | 1    | 23   | 8   | 15   | 1    | 14   | Min. Setup |
| Fast-10 | 50   | 16 | 34  |      | 33   |     | 25   |      | 24   | Hold |
| Fast-20 | 25   | 13 | 12  | 0.5  | 11.5 | 5   | 6.5  | 0.5  | 6    | Min. Setup |
| Fast-20 | 25   | 8  | 17  |      | 16.5 |     | 11.5 |      | 11   | Hold |
| Fast-40 | 12.5 | 3  | 9.5 | 0.25 | 9.25 | 4.5 | 4.75 | 0.25 | 4.5  | Min. Setup |
| Fast-40 | 12.5 |    | 9.5 |      | 9.25 |     | 4.75 |      | 4.5  | Hold |

TABLE 2

Dual Transition

| Standard | Total Budget (½ period) | Delay At Chip Output | Chip Skew | Board Skew | Budget At Connector | Cable Skew | Budget At Connector | Board Skew | Final | |
|---|---|---|---|---|---|---|---|---|---|---|
| Fast-10 | 50   | 10   | 40 | 1.6 | 38.4 | 26.8 | 11.8 | 1.6 | 10   | Min. Setup |
| Fast-10 | 50   |      | 40 |     | 38.4 |      | 11.6 |     | 10   | Hold |
| Fast-20 | 25   | 5    | 20 | 0.8 | 19.2 | 13.4 | 5.8  | 0.8 | 5    | Min. Setup |
| Fast-20 | 25   |      | 20 |     | 19.2 |      | 5.8  |     | 5    | Hold |
| Fast-40 | 12.5 | 2.5  | 10 | 0.4 | 9.6  | 6.7  | 2.9  | 0.4 | 2.5  | Min. Setup |
| Fast-40 | 12.5 |      | 10 |     | 9.6  |      | 2.9  |     | 2.5  | Hold |
| Fast-80 | 6.25 | 1.25 | 5  | 0.2 | 4.8  | 3.35 | 1.45 | 0.2 | 1.25 | Min. Setup |
| Fast-80 | 6.25 |      | 5  |     | 4.8  |      | 1.45 |     | 1.25 | Hold |

In these examples, signal timing skew includes the cable skew and the signal distortion skew in which the signal distortion includes intersymbol interference (ISI) and signal crossing time through the signal detection range. Each of these tables shows the ideal setup and hold timings for a particular type of transfer for a SCSI standard. The tables also illustrate the amount of chip skew, board skew, and signal timing skew. The final resulting setup and hold times are minimal setup and hold times required for proper signaling under the particular SCSI standard.

In the tables, the columns Budget At Chip, Budget At Connector, and Final show the remaining budget from the Total Budget column resulting from the skew shown in the columns Delay at Chip Skew, Board Skew, and Cable Skew.

For example Budget At Chip Skew for Fast-10 is 40 in Table 2 and is obtained by subtracting the Delay at Chip Output (10) from the Total Budget (50). The Budget At Connector (38.4) is obtained by subtracting the Board Skew (1.6) from the Budget At Chip (40) for Fast-10.

The comparison of single transition data transfers in Table 1 for Fast-5 SCSI standard with the Fast-40 SCSI standard shows that the total skew allowed for board and cable routing is 10 nanoseconds for Fast-5 SCSI standard and 5 nanoseconds for Fast-40 SCSI standard. However, relative to the respective transfer half periods this skew goes up from 10% for Fast-5 SCSI standard to 20% for Fast-40 SCSI standard. As the transfer rates increase further, the percentage of timing transfer period taken up by the data skew increases. In Table 2, the Fast-80 SCSI standard allocates 30% of the period to skew in the board and cable routing while requiring more data setup and hold for transmitting devices and providing less data setup and hold time for receiving devices. The minimum setup and hold time periods are 4.5 nanoseconds for each in the single transition Fast-40 SCSI standard while in the dual transition Fast-80 SCSI standard, the standard allows only 1.25 nanoseconds for setup and hold time for the period of 12.5 nanoseconds. In the 4.5 nanosecond example, the period of time is 25 nanoseconds.

As a result, these kind of changes limit any faster data transfers. The present invention recognizes that present SCSI technology does not employ delayed equalization among data channels. Methods of delay and equalization are known in fiber channel technology. These methods are based upon external insertion of resistor/inductor/capacitor (RLC) delay elements in each channel or upon equalization of low-to-high and high-to-low internal delays. Fiber channel lends itself to these types of mechanisms because it is a single channel transmission. These types of mechanisms are prohibitive with the presently available SCSI technology for a number of reasons. First, the SCSI transmission media is often changing. Redundant array of inexpensive drives (RAID) change load and delay in response to removal of drives and the addition of new drives. The large number of parallel channels make external channel delay equalization costly because changes in load require a manual readjustment of the delay for each parallel channel. Additionally, SCSI technology does not provide for access to internal nodes for accurate determination of delay skews among data channels.

Therefore, it would be advantageous to have an improved method and apparatus for equalizing delays or to minimize data skew to allow for greater transfer rates in a SCSI system.

SUMMARY OF THE INVENTION

The present invention provides a method and apparatus for managing transmission of data signals in a plurality of data lines. Data signals are received on the data lines and a reference signal. On each of the data lines, a delay between the data signal and the reference signal is measured to form a plurality of delay measurements. A set of delay values from the delay measurements is generated. In a preferred embodiment of the present invention, the delay values are selected to equalize the delay in each of the data lines to have the same delay as the data line having the longest delay. The delay values are used to adjust delay in a transmission in each of the plurality of data signals in the data lines. In the preferred embodiment of the present invention, the reference signal is set such that transitions for the data signals are centered to the middle of a pulse for the reference signal.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a pictorial representation of a data processing system in which the present invention may be implemented depicted in accordance with a preferred embodiment of the present invention;

FIG. 2 is a block diagram illustrating a data processing system in which the present invention may be implemented;

FIG. 3 is a diagram illustrating a SCSI system depicted in accordance with a preferred embodiment of the present invention;

FIGS. 4A–D are timing diagrams illustrating SCSI signals equalized by the present invention depicted in accordance with a preferred embodiment of the present invention;

FIG. 5 is a flowchart of a process used by a host to initiate an equalization process depicted in accordance with a preferred embodiment of the present invention;

FIG. 6 is a flowchart of a process used by a target device to perform an equalization process depicted in accordance with a preferred embodiment of the present invention;

FIG. 7 is a block diagram illustrating an equalization system depicted in accordance with a preferred embodiment of the present invention;

FIG. 8 is a logic diagram of a delay unit depicted in accordance with a preferred embodiment of the present invention;

FIG. 9 is a diagram of a delay depicted in accordance with a preferred embodiment of the present invention;

FIG. 10 is a delay tap multiplexer depicted in accordance with a preferred embodiment of the present invention;

FIG. 11 is a logic diagram of a SCSI data input delay counter depicted in accordance with a preferred embodiment of the present invention;

FIG. 12 is a logic diagram of a ring oscillator circuit depicted in accordance with a preferred embodiment of the present invention;

FIG. 13 is a timing diagram of signals used in a delay counter depicted in accordance with a preferred embodiment of the present invention;

FIG. 14 is a block diagram of a delay adjustment calculator depicted in accordance with a preferred embodiment of the present invention;

FIG. 15 is a flowchart of a process used to calculate adjustment values depicted in accordance with a preferred embodiment of the present invention;

FIG. 16 is a diagram illustrating delay adjustment values generated by a delay adjustment calculator depicted in accordance with a preferred embodiment of the present invention; and FIGS. 17A and 17B are timing diagrams of acknowledge and data signals depicted in accordance with a preferred embodiment of the present invention.

DETAILED DESCRIPTION

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCD local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface.

The depicted example in FIG. 2 and above-described examples are not meant to imply architectural limitations. For example, data processing system 200 also may be a notebook computer or hand held computer.

Turning now to FIG. 3, a diagram illustrating a SCSI system is depicted in accordance with a preferred embodiment of the present invention. SCSI system 300 may be found within a data processing system, such as data processing system 200 in FIG. 2. In this example, protocol chip 302 is a chip used to send and receive data signals in SCSI system 300. Protocol chip 302 is located on a board 304. A connector 306 provides a connection for cable 308. In turn, cable 308 is connected to SCSI device connector 310, providing a connection to board 312, containing protocol chip 314. The processes of the present invention are implemented in a SCSI device and may be implemented in protocol chip 302 and protocol chip 314 in the depicted examples. In particular, the processes are used to provide the needed time to set up and hold data for latches 316 and protocol chip 302 and latches 318 in protocol chip 314. Latches 316 and latches 318 are part of the circuitry within protocol chip 302 and protocol chip 314 used to receive data from data lines in the SCSI bus.

With reference now to FIGS. 4A–4D, timing diagrams illustrating SCSI signals equalized by the present invention are depicted in accordance with a preferred embodiment of the present invention. These figures illustrate the required set up and hold times for a single data channel. With multiple data channels, the problems illustrated are compounded.

In FIG. 4A, reference signal 400 is illustrated along with a SCSI data signal 402. Reference signal 400 is a SCSI acknowledge (ACKN) signal when data is received at a target device. When data is received at a host, reference signal 400 is a SCSI request (REQN) signal. In this example, reference signal 400 functions as a clock signal. The transition of data signal 402 occur at ideal times for setting up a signal to be held in latches in the protocol chip. In this example, data setup is illustrated by time period t1, while the data hold required is represented by time period t2. The data must be present for a period of time before the clock transition and for a period of time after the clock transition. The period of time that the data must be present at the latches prior to the clock transition is referred to as the "setup" time while the amount of time the data must be present at the latches after the clock transition is referred to as the "hold" time. This setup and hold time is required to provide enough time for the latches or flip-flops to acquire the data. Otherwise, data errors may occur in latches, such as those in a chip, such as latches 318 in protocol chip 314 in FIG. 3.

In FIG. 4B, uncertainty in the signals is illustrated after the SCSI acknowledge signal and the SCSI data signal are transferred containing chip and board skew when board 312 is the target. Additional uncertainty in the signals is introduced after cable skew is added into acknowledge signal 400 and SCSI data signal 402 as shown in FIG. 4C. The amount of uncertainty in signal 400 and data signal 402 is illustrated in FIG. 4D. As can be seen, data setup time represented by time period t3 and data hold time represented by time period t4 are much smaller than that illustrated in FIG. 4A. Thus, as can be seen, the skew caused by various sources in transmitting data and signals reduces the data setup and data hold times available to hold data.

The present invention provides a method and apparatus for equalization of relative delay skew among different data channels. This equalization may be applied to various parallel data transfer systems, such as SCSI bus systems. The present invention provides delay equalization on a per channel basis. This equalization mechanism is employed for a number of reasons. For example, the control of delay skew between pairs of SCSI cables is limited by mechanical means of cable manufacturing. Other control means for delay skew between two protocol chips, such as a host and target, and among 27 data channels for two buses is limited by the accuracy of various computer aided design tools for layout to parasitic extraction. The present invention recognizes that the integrated circuit packages used for SCSI devices, such as ball grid array (BGA), exhibit pin-to-pin delay on the order of 30 pico seconds to 50 pico seconds. The back-plane boards exhibit delay skew among pairs of signal traces presently in the order of a nanosecond. Also recognized is the change of load in devices, such as RAUD boxes, demands automated or semi automated equalization on a per channel basis.

The presently available methods of equalization previously described above are not adequate for newer SCSI technologies. These presently available methods do not sufficiently equalize delay skews to account for factors such as, changes in temperature and power supply.

More specifically, the mechanism of the present invention provides a per channel delay equalization that may adjust for delay skew in an automated fashion. Additionally, the mechanism of the present invention may perform delay channel equalization at regular periods of time to account for various changes, such as changes in ambient temperature and/or power supply.

With reference now to FIG. 5, a flowchart of a process used by a host to initiate an equalization process is depicted in accordance with a preferred embodiment of the present invention. The process illustrated in FIG. 5 is one that may be implemented in a host controller, such as in host bus adapter 212 in FIG. 2. The process begins by initiating a delay equalization phase (step 500). In the depicted example, this phase is initiated during the domain validation performed by the SCSI protocol. Thereafter, the host controller sends a delay measure start command to one or more target devices to initiate delay measurement sequences and the various target devices (step 502). The host controller then performs a synchronous data out transfer (step 504) with the process terminating thereafter. This synchronous data out transfer may include, for example, sending a 00FF or any other suitable data pattern of a specific length to the targets on all of the data channels. This synchronous data out transfer also includes sending an acknowledgement (ACKN) to the targets.

With reference now to FIG. 6, a flowchart of a process used by a target device to perform an equalization process is depicted in accordance with a preferred embodiment of the present invention. The target device may be, for example, disk 226 in FIG. 2. The process begins by the target device receiving a delay start measurement command from a host device (step 600). Thereafter, the target device receives data and acknowledgment signals on all of the data channels to the host device (step 602). The target device will measure the delay from each acknowledgment signal transition to each incoming data input transition (step 604). This measurement may be made with a delay counter, which is described in more detail below. This delay is stored (step 606). Steps 604 and 606 are performed for each data input channel. Each of the delay values is stored in a different latch in these examples.

Thereafter, input delay adjustment values are calculated (step 608). In these examples, the stored count for each input data channel is sent to a delay adjustment calculator block, which performs the calculations necessary to identify input delay adjustment values for the different data channels. These values are sent to an input delay adjust mechanism (step 610) with the process terminating thereafter. This input delay adjust mechanism is described in more detail in FIGS. 7–10 below. In these examples, the adjustment mechanism is located in the protocol chip on the device receiving data using data lines or input channels. The processes illustrated in FIGS. 5 and 6 are equally applicable to provide for skew adjustment in transmitting data from a target to a host. In other words, these process also may be applied to a host receiving data from a target. When adjusting for skew on the host side, the mechanism of the present invention is located in the host.

The input delay adjust block takes the values for each of the data input channels and the acknowledgement input channel for adjusting the delay of the signals. The delay of each individual channel is adjusted to the slowest data channel using a delay chain included in each data channel in accordance with a preferred embodiment of the present invention. The delay chain is described in more detail with respect to FIGS. 8 and 9. The sequence of events illustrated in FIGS. 5 and 6 may be repeated for various types of delay skew adjustment such as coarse and fine. In addition, these processes may be performed at regular time intervals between data transfers for long term delay skew drifts to take in account changes in operating factors, such as temperature and power supply.

With reference now to FIG. 7, a block diagram illustrating an equalization system is depicted in accordance with a preferred embodiment of the present invention. Equalization system 700 is located in a protocol chip, such as protocol chip 302 or 314 in FIG. 3. Equalization system 700 is placed in both target devices and host adapters or controllers in depicted examples. When located in a target device, equalization system 700 is used to equalize delays in data received by the target device. When located in a host, equalization system 700 is used to equalize delays in data sent by a target device.

Equalization system 700 in this example includes an input delay adjustment unit 702 and a delay counter 704 for each input data channel. In the depicted examples, 16 channels are present. Thus, 16 of these input delay adjust and delay counter units are present in equalization unit 700. Input delay adjust unit 702 is connected to a data channel at input 706, which is sent on for processing at output 708. The signal is delayed by some amount of time in which the amount of time is set by input 710. Input 710 is used to receive a delay value for input delay adjust unit 702. This delay in some cases may be zero. Delay counter 704 also receives a delay signal at input 712 as well as an acknowledgement signal at input 714. A measurement of the delay between the transition of the acknowledge signal and the data signal is measured and stored within a latch within delay counter 704. This delay value may be output at output 716 to the delay adjustment calculator 718, which receives at input 720 the delay measurement from output 716 in delay counter 704. In this example, only one input delay adjustment unit is shown for purposes of more clearly describing the invention. In accordance with a preferred embodiment of the present invention, multiple input delay adjustment units may each generate a delay measurement, which is received by delay adjustment calculator 718.

In response to receiving a delay measurement, a delay value is calculated by delay adjustment calculator 718 and sent back to the input delay adjustment unit 702 through output 722 to input 710 in delay adjustment unit 702. Of course, with multiple delay adjustment units, a delay value may be calculated and sent to each delay adjustment unit. In accordance with a preferred embodiment of the present invention, delay adjustment calculator 718 selects a delay for a particular data line or channel by setting the delay value equal for the particular data line or channel equal to the delay of the data line having the longest delay. In this example, only a single delay adjustment calculator is required for multiple input delay adjustment units and delay calculators.

Input delay adjustment unit 702 delays the data signal input at input 706 for some period of time prior to the data appearing at output 708. Further, an input delay adjustment unit, such as input delay adjustment unit 702, is connected to the line providing the acknowledge signal.

With reference now to FIG. 8, a logic diagram of a delay unit is depicted in accordance with a preferred embodiment of the present invention. Delay unit 800 may be implemented in input delay adjustment unit 702 in FIG. 7 to provide a delay for data received from a data line or input channel. Delay unit 800 includes delay 1 802, delay 2 804, delay 3 806, through delay N 808. N may be any number and will vary depending on the implementation. SCSI input data is input into input 810 in delay 1 802. This input corresponds to input 706 in FIG. 7. Outputs for the SCSI data are found at delay tap 1 812, delay tap 2 814, delay tap 3 816, through delay tap N 818. Each of these delays also has an output to another delay except for delay tap N 818 because it is the last delay in the chain.

With reference now to FIG. 9, a diagram of a delay is depicted in accordance with a preferred embodiment of the present invention. In this example, delay 900 includes two delay cells 902 and 904. In this example, cell 902 includes input 906, which is connected to a series of inverters 11–14. Inverter 14 has its output connected to input of NAND gate A1. The output of NAND gate A1 has its output connected to delay buffer D1. In addition, NAND gate A1 is enabled by upper power supply voltage VDD in this example. Cell 904 in this example has an input connected to the output of NAND gate A1, which is connected to a series of inverters I5–I10. The output of inverter I10 is connected to the input of NAND gate A2. Additionally, this NAND gate is enabled by upper power supply VDD. The output of NAND gate A2 is connected to delay buffer D2, which has its output connected to output 908. The output of NAND gate A2 may be connected to the input of an inverter in another cell.

Input 906 is connected to the SCSI data input if delay 900 is the first delay in the series. Intermediate delays has input 906 connected to the output of a NAND gate in a previous delay, such as NAND gate A2. Output 908 forms the output for a delay tap in this example. Delay taps may be selected using a selection mechanism, such as a multiplexer.

Turning next to FIG. 10, a delay tap multiplexer is depicted in accordance with a preferred embodiment of the present invention. Delay tap multiplexer 1000 is used to select taps from an input delay adjust unit, such as input delay adjust unit 800 in FIG. 8.

In this example, delay tap multiplexer 1000 includes a SCSI data input 1002 as well as delay tap 1 input 1004, delay tap 2 input 1006, delay tap 3 input 1008 through delay tap N input 1010. N may be any number depending on the implementation. Additionally, input 1012 is used to select the particular delay tap signal that is to be used to delay the signals entering SCSI data input 1002. SCSI data from SCSI data input 1002 is output at output 1014 after the delay selected using input 1012.

With reference now to FIG. 11, a logic diagram of a SCSI data input delay counter is depicted in accordance with a preferred embodiment of the present invention. Data input delay counter 1100 contains a transition detector 1102 and a transition detector 1104. In addition, data input delay counter 1100 also includes a latch 1106, a latch 1108, and a counter 1110. Acknowledge signal is input into input 1112 into transition detector 1102. SCSI data from one of the channels is input into input 1114 into transition detector 1104. Transition detector 1102 and transition detector 1104 are used to detect transitions in the acknowledge and data signal input to input 1112 and 1114, respectively. The detection of a transition results in output signals being generated by the transition detectors. These outputs are input into latch 1106, which is a set-reset (SR) latch in this example. When a transition occurs in the acknowledge signal applied to input 1112, latch 1106 generates an output that is sent to counter 1110. Additionally, the output of transition detector 1104 is used as an input to latch 1108. Latch 1108 also receives as an input the output of counter 1110. The output 1116 of latch 1108 provides a count containing a measured delay value between the acknowledge signal and data signal into transition detector 1102 and transition detector 1104. The output of transition detector 1102 also provides a reset signal for counter 1110 in which the reset signal resets the count to zero. The enable signal, conten, will start to count the amount of delay between the acknowledge signal and data signal. Counter 1110 is driven by a clock signal input at input 1118, which is a high frequency clock signal in this example. This high frequency clock signal may be generated, for example, by ring oscillator circuit connected to input 1118.

With reference now to FIG. 12, a logic diagram of a ring oscillator circuit is depicted in accordance with a preferred embodiment of the present invention. Ring oscillator circuit 1200 is used to generate a clock signal used to measure delays in data signals received from data lines. Ring oscillator circuit 1200 includes inverters I11–I14, which are hooked up in series. The output of inverter I14 is connected to NAND gate A3. NAND gate A3 also includes an input 1202. This input is configured for receiving a ring oscillator enable signal to enable the output for NAND gate A3. The output of NAND gate A3 is connected to delay buffer D3, which in turn has its output connected to output 1204. This output provides a clock signal into input 1118 in delay counter 1100 in FIG. 11, as described above.

Additionally, the output of NAND gate A3 is also connected to the input of inverter I11. Of course the logic illustrated is for illustrative purposes only. Many different configurations are possible depending on the particular implementation. For example, different number of inverters may be used as well as different types of circuits to provide a ring oscillator output.

In accordance with a preferred embodiment of the present invention, the elements of the ring oscillator circuit in FIG. 12 are identical to the cells in FIG. 9. Each circuit in cell 902 and cell 904 contains elements corresponding to those of ring oscillator circuit 1200 in FIG. 12. Alternatively, another inverter may be used in place of the NAND gate. In the depicted example, two sets of elements matching those of ring oscillator circuit 1200 in FIG. 12 are used in each delay, such as delay 900 in FIG. 9 such that the output at output 908 has a period that is twice the propagation of the four inverters and the NAND gate, which requires the use of two sets of elements matching those of ring oscillator circuit 1200 in FIG. 12. The invention matches delays in the delay cells with elements in the ring oscillator. Different elements may be used as long as the delays are matched. The delay is exactly the same as the delay between tap output points of the input delay adjustment circuit because each of the four inverters, NAND gate, buffer elements used in the delay cell match those in the ring oscillator circuit, in terms of transistor sizes layout, and orientation. Additionally, in accordance with a preferred embodiment of the present invention, the physical location of the input delay adjust circuit is adjacent to the ring oscillator circuit on the chip. In this example, ring oscillator circuit 1200 may be implemented within input delay adjustment unit 702 in FIG. 7.

The mechanism of the present invention allows for delay adjustments to be made to SCSI data input to a resolution equal to or less than the period of the ring oscillator output. A smaller resolution may be accomplished by using smaller delay elements in the delay cells.

With reference now to FIG. 13, a timing diagram of signals used in a delay counter, such as delay counter 1100 in FIG. 11 is depicted in accordance with a preferred embodiment of the present invention. Acknowledge (ACKN) signal 1300 is the signal input into input 1112 in FIG. 11. SDN signal 1302 is the SCSI data signal input into input 1114 in FIG. 11. Set signal 1304 is the signal generated by transition detector 1102 used to reset counter 1110 in FIG. 11. Clear signal 1306 is the clear signal generated by transition detector 1104 that is input into latch 1106. Next, conten signal 1308 is the output of SR latch 1106 in FIG. 11. HFC signal 1310 is the high frequency clock signal input into input 1118 in FIG. 11. Count signal 1312 is the value generated by latch 1108 at output 1116.

Still referring to FIG. 13, a transition from high to low of acknowledge signal 1300 initiates a generation of set signal 1304 by transition detector 1102 in FIG. 11. This signal sets latch 1106 in FIG. 11 to high, which makes the output of latch 1106, conten signal 1308, to become high. As a result, counter 1110 is enabled. When a data signal, such as SDN signal 1302 becomes high, a clear signal 1306 is generated by transition detector 1104. This clear signal resets latch 1106 causing conten signal 1308 to go low and stop counter 1110. This clear signal also causes latch 1108 to load the value of counter 1110. Counter 1110 increments by 1 for each high frequency clock pulse as shown in HFC signal 1310.

With reference now to FIG. 14, a block diagram of a delay adjustment calculator is depicted in accordance with a preferred embodiment of the present invention. Delay adjustment calculator 1400 includes a microcontroller 1402, which performs operations using a delay calculation program located in memory 1404. The program may be accessed by microcontroller 1402 using program address bus 1406. Operation codes, also referred to as "opcodes", are returned to microcontroller 1402 by memory 1404 using opcode bus 1408. Delay counts are obtained from memory map registers 1410 using data address bus 1412 and data bus 1414. Calculated delay adjustment values are returned to memory mapped registers 1410.

With reference now to FIG. 15, a flowchart of a process used to calculate adjustment values is depicted in accordance with a preferred embodiment of the present invention. The processes in FIG. 15 may be implemented in a program located in memory 1404 in FIG. 14 and executed by microcontroller 1402 in FIG. 14.

The process begins by reading delay count values for all SCSI data inputs (step 1500). The delay count value is obtained for each data line or channel in step 1500. Next, a maximum delay count value is identified (step 1502). The maximum delay is selected because the shorter delays would leave out the longest delay. As a result, the longest delay could not be adjusted. An adjust delay value is selected for each data line or channel that is equal to the maximum delay count minus the delay count for the data line or channel (step 1504). Using step 1504, each of the data lines or channels may have their delays adjusted to equal the maximum delay count value. In this way, all of the data lines may be set to have the same delay. Then, the adjust delay value for the reference signal, ACKN, is set equal to the maximum delay count minus one half of the transfer period (step 1506) with the process terminating thereafter. Step 1506 is used to set or adjust the reference signal such that the transition in the signals on the data lines or channels occur in the middle of a pulse for the reference signal.

FIG. 16 is a table illustrating delay adjustment values generated by a delay adjustment calculator depicted in accordance with a preferred embodiment of the present invention. These delay adjustment values are those that are generated by delay adjustment calculator, such as delay adjustment calculator 1400 in FIG. 14. These outputs are generated in response to various delay count inputs for different channels. The delay count values are the inputs, such as input 720 in FIG. 7, while the delay adjustment values are those output such as output 722 in FIG. 7. The outputs illustrated in FIG. 16 are calculated using the process depicted in the flowchart of FIG. 15.

With reference now to FIGS. 17A and 17B, timing diagrams of acknowledge and data signals are depicted in accordance with a preferred embodiment of the present invention. Acknowledge signal 1700 and data signal 1702 are examples of signals prior to timing adjustment using the mechanism of the present invention. As can be seen, the transition of acknowledge signal 1700 with respect to data signal 1702 provides a large area of uncertainty in which data may not be valued as illustrated in sections 1704–1710. After measuring delays and providing delay adjustment values, acknowledge signal 1712 in FIG. 17B is adjusted as shown. As a result of the adjustments to the acknowledged signal and the data signals, the regions of uncertainty in data signal 1714 are smaller as can be seen in sections 1716–1722.

Thus, the present invention provides an improved mechanism for equalizing delay of data channels. The present invention provides this advantage by allowing equalization of the total data channel delay regardless of the cause or origin. The mechanism is independent of any type of semiconductor process, ambient temperature, and power supply variations because the equalization provided is only with respect to relative differences in the delay of all of the data channels being equalized. The accuracy of the mechanism in the present invention is based only upon the external crystal drift, which is a ceramic disk acting as a RLC circuit and providing a basic reference frequency signal. The crystal controls the timing of acknowledge and data signals. Additionally, the mechanism of the present invention allows for automated delay equalization, which is repeatable in regular time intervals. The mechanism of the present invention is digital and may be placed within the core of a SCSI controller system. Additionally, these delay elements may be implemented using standard cells.

The description of the preferred embodiment of the present invention has been presented for purposes of illustration and description, but is not intended to be exhaustive or limited to the invention in the form disclosed. Many modifications and variations will be apparent to those of ordinary skill in the art. For example, the processes of the present invention may be implemented bi-directionally. Recognize signals and transmissions from a target or slave device may be sent to a host device to account for skew in data received by the host adapter. Further, the measurements generated by the circitry of the present invention may be accessed externally for use in diagnostics or performance measurements. The measurements made by the circuitry of the present invention may be placed in registers currently accessible externally. The embodiment was chosen and described in order to best explain the principles of the invention the practical application to enable others of ordinary skill in the art to understand the invention for various embodiments with various modifications as are suited to the particular use contemplated.

What is claimed is:

1. A method for managing, reception of data signals on a plurality of data lines, the method conspiring:
    receiving data signals on the plurality of daunt lines and a reference signal; measuring a delay between the data signal a and the reference signal on each of the plurality of data lines, based on a periodic timing reference to form a plurality of delay measurements;
    generating a set of delay values from the plurality of delay measurements; and
    using the set of delay values to adjust delay in a reception in each of the plurality or data signals in the plurality of data lines.

2. The method of claim 1, wherein a delay value is selected for a data line in the plurality of data lines to adjust a delay for the data line to a slowest data line within the plurality of data lines.

3. The method of claim 7, wherein the plurality of data lines arc in a small computer system interface bus.

4. The method of claim 1, wherein the plurality of data lines is sixteen.

5. The method of claim 1, wherein the delay in a data line within the plurality of data lines is implemented using a delay chain.

6. The method of claim 1, wherein the receiving, measuring, and generating steps arc performed in response to a command from a host device.

7. The method of claim 1, wherein the receiving, measuring, and generating stops are performed periodically and changes in delay caused by temperature changes are minimized.

8. The method of claim 1, wherein the reference signal is an acknowledgement signal.

9. The method of claim 1, wherein the measuring step is accomplished using a delay counter.

10. The method of claim 1, wherein the data signal is a test signal.

11. The method of claim 1, wherein the plurality of data lines required a different delay value.

12. The method of claim 1, wherein the step of generating a set of delay value comprises:
    identifying a data line within the plurality of data lines having a longest delay within the plurality of delay measurements; and
    selecting delay values for other data lines within the plurality of delay lines, wherein the delay values set the delay for the other data lines equal to the data line.

13. The method of claim 12, further comprising:
    selecting a delay value for the reference signal, wherein the delay value causes transitions in the data signals received from the plurality of lines to occur during a middle of a pulse for the reference signal.

14. The method of claim 1, wherein the step of generating a set or delay value comprises:
    identifying a largest delay within the set or delay values;
    selecting delay value for each of the plurality of data lines equal to the largest delay minus the delay for each of the data line plurality of data lines.

15. The method of claim 1, wherein the receiving, measuring, and generating steps are performed in a target device.

16. The method of claim 1, wherein the receiving, measuring, and generating steps are performed in a host device.

17. A method for equalizing a reception of data signals in a plurality of input channels in a device, the method comprising:
    receiving a data signal from each of the plurality of input channels in the device and a reference signal;
    identifying a delay between a transition in the data signal and a transition in the reference signal on each channel of the plurality of input channels, based on a periodic timing reference, to form a plurality of delays; and
    using the plurality of delays to adjust a delay in a reception of a data signal on each channel within the set of input channels to increase a setup and a hold time for the plurality of data signals.

18. The method of claim 17, wherein the reference signal is an acknowledgment signal.

19. The method of claim 17, wherein the plurality of input channels lines are in a small computer system interface device.

20. The method of claim 17, wherein the plurality of input channels is sixteen.

21. The method of claim 17, wherein the receiving and identifying steps are performed in response to a signal from a lost device.

22. The method of claim 17, wherein the receiving and identifying steps are performed periodically.

23. The method of claim 17, wherein the delay in an imput channel with the plurality of input channels is implemented using a plurality of delay chains.

24. A data processing system comprising:
    a plurality of data lines;
    a host device connected to the plurality of data lines, wherein the host device transmits a data signal on each of the plurality or data lines to form a set or transmitted data signals and transmits another signal; and
    a target device connected to the plurality of data lines, wherein the target device receives the set of transmitted data signals, nicasures a delay between a transmitted data signal in the set of transmitted data signals and the another signal for each of the plurality of transmitted data signals, based on a periodic timing reference, to generate a sot of delay values, adjusts a delay at the target device for each of the plurality of data lines based on the set of delay values.

25. The data processing system of claim 24, wherein the target device includes a set of delay counters, wherein each delay counter is associated with a data line in the plurality of data lines and each delay center in the set of delay counters is used to measure a period of time between a transition data signal and the another signal.

26. The data processing system of claim 25, wherein the target device includes a delay adjustment calculator, wherein the delay adjustment calculator generates the set of delay values using delays measured by the set of delay counters.

27. The data processing system of claim 26, wherein the target device includes a set of input delay adjust units, wherein each input delay adjust unit is connected to a data line within the plurality of data lines and delays transmission of a signal using a delay value for the data line from the set of delay values.

28. The data processing system of claim 24, wherein the plurality of data lines form a small computer system interface bus.

29. The data processing system of claim 24, wherein the data processing system is a personal computer.

30. The data processing system of claim 24, wherein the data processing system is a workstation.

31. A channel delay apparatus comprising.
    a delay adjustment unit, a first set of inputs for receiving data from a plurality of data channels, a second set of inputs for receiving, a set of delay values, and set of outputs at which the data received at the first set of inputs is transmitted, and a delay mechanism, wherein the delay mechanism delays travelling from the first set of inputs to the set of outputs based on the set of delay values, wherein data for a data channel in the set of data channels is delayed relative to data for another data channel in the set of data channels using a delay value from the set of delay values;
    a delay counter unit having a first set of inputs for receiving data from the plurality of data channels and a reference signal from a signal line and a set of outputs, wherein the delay counter unit is based on a periodic timing reference and measures a delay between data in each of the plurality of data channels and the reference signal on the signal line and generates a set of measured delay values at the set of outputs; and
    a delay adjustment calculation unit having a plurality of inputs corrected to the set of outputs in the delay counter and a set of outputs connected to the second set of inputs in the delay adjustment unit, wherein the delay calculation unit generates the set of delay values using the set of measured delay values.

32. The channel delay apparatus of claim 31, wherein the apparatus is located in a host bus adapter.

33. The channel delay apparats of claim 31, wherein the apparatus is located in disk drive.

34. The channel delay apparatus of claim 31, wherein the input adjust delay unit includes a plurality of delays.

35. The channel delay apparatus of claim 32, wherein each of the plurality of delays includes a set of delay elements connected in series.

36. The channel delay apparatus of claim 35, wherein data is transmitted through the set of delay elements, wherein each of the set of delay elements includes an output, and wherein the channel delay apparatus delays a signal travelling from an input in the first set of output in the set of outputs by selecting an output from the set of delay elements.

37. The delay channel apparatus of claim 31, wherein the reference signal is an acknowledgement signal.

38. The delay channel apparatus of claim 31, wherein the delay counter unit includes a plurality of delay counter circuits, wherein each of the plurality of delay courtier circuits is associated with a data channel within the plurality of data channels and comprises:
    a first transition detector having an input configured to receive data and an output;
    a second transition detector having an input configured to receive the reference signal ailed an output;
    a first latch having a first input, a second input, and an output, wherein the first input is connected to the output of the first transition detector and the second input is connected to the output of the first transition detector;
    a counter having a first input, a reset input, a clock input, and an output, wherein the first input is connected to the output of the latch, the resect input is connected to the output of the first transition detector, and the clock input is configured to receive a clock signal; and
    a second latch having a first input, a second input, and an output, wherein the first input is connected to the output of the counter, wherein the second input is connected to tile output of the counter, and wherein the output generates a delay value.

39. The delay channel apparatus of claim 31, wherein the delay adjustment unit includes a plurality of delay units, wherein each delay unit is associated within a data channel within the plurality of data channels and wherein each delay unit includes a set of delay cells in which each delay cell contains at least one delay client.

40. The delay channel apparatus of claim 31, wherein each delay unit includes a two delay elements.

41. The delay channel apparatus of claim 38, wherein a ring oscillator circuit generates a clock signal for application to tic clock input in the counter.

42. A data processing system for managing reception of data signals on a plurality of data lines, the data processing system comprising:
    reciving means for receiving data signals on the plurality of data lines and a reference signal;
    measuring means for measuring a delay between the data signal and the reference signal on each of the plurality of data lines, based on a periodic timing reference to form a plurality of delay measurements;
    generating means for generating a set of delay values from the plurality of delay measurements; and
    using means for using the set or delay values to adjust delay in a reception in each of the plurality of data signals in the plurality of data lies.

43. The data processing system of claim 42, wherein a delay value is selected for a data line in the plurality of data lines to, adjust a delay for the data line to a slowest data line within the plurality of data lines.

44. The data processing system of claim 42, wherein the plurality of data lines are in a small computer system interface bus.

45. The data processing system of claim 42, wherein the plurality of data lines is sixteen.

46. The data processing system of claim 42, wherein the delay in a data line within the plurality of data lines is implemented using a delay chain.

47. The data processing system of claim 42, wherein the receiving mains, measuring means, and generating means are initiated in response to a command from a host device.

48. The data processing system of claim 42, wherein the receiving means, measuring means, and generating means are initiated periodically and changes in delay caused by temperature changes are minimized.

49. The data processing system of claim 42, wherein the reference signal is an acknowledgment signal.

50. The data processing system of claim 42, wherein the measuring means is accomplished using a delay counter.

51. Tie data processing system of claim 42, wherein the data signal is a test signal.

52. The data processing system of claim 42, wherein the plurality of data lines requires a different delay value.

53. The data processing system of claim 42, wherein the generating means:

identifying means for identifying a data line within the plurality of data lines having a longest delay within the plurality of delay measurements; and selecting means for selecting delay values for other data lines within the plurality of delay lines, wherein the delay values set the delay for the other data lines equal to the data line.

54. The data processing system of claim 53 further comprising:

second selecting means for selecting a delay value for the reference signal, wherein the adjusted delay value causes transitions in the data signals received from the plurality of lines to occur during a middle of a pulse for the reference signal.

55. The data processing system of claim 42, wherein the generating means:

identifying means for identifying a largest delay within the set of delay values;

selecting means for selecting delay value for each of the plurality of data lines equal to the largest delay minutes the delay for each of the data line plurality of data lines.

56. Tho data processing system of claim 42, wherein the receiving means, measuring means, and generating means are located in a target device.

57. The data processing system of claim 42, wherein the receiving means, measuring means, and generating, means are located in a host device.

58. A data processing system for equalizing a reception of data signals in a plurality of input channels in a device, tie data processing system comprising:

receiving means for receiving a data signal form each of the plurality of input channels in the device and a reference signal;

identifying means for identifying a delay between a transition in the data signal and a transition in the reference signal on each channel of the plurality of input channels, based on a periodic timing reference, to form a plurality of delays; and using means for using the plurality of delays to adjust a delay in a reception of a data signal on each channel within the set of input channels to increase a setup and a hold time for the plurality of data signals.

59. The data processing system of claim 58, wherein the reference signal is an acknowledgment signal.

60. The data processing system of claim 58, wherein the plurality of input channels lines are in a small computer system interface device.

61. The data processing system of claim 58, wherein the plurality of input channels is sixteen.

62. The data processing system of claim 58, wherein the receiving means and identifying means are initiated in response to a signal from a host device.

63. The data processing system of claim 58, wherein the receiving means and identifying means are initiated periodically.

64. The data processing system of claim 58, wherein the delay in an input channel within the plurality of input channels is implemented using a plurality of delay structures.

65. A computer program product in a computer readable medium for managing transmission of data signals on plurality of data lines, the computer program product comprising:

first instructions for receiving data signals on the plurality of data lines and a reference signal;

second instructions for measuring a delay between the data signal and the reference signal on each of the plurality of data lines, based on a periodic timing reference, to form a plurality of delay measurements;

third instructions for generating a set of delay values from the plurality of delay measurements; and fourth instructions for using the set of delay values to adjust delay in a transmission in each of the plurality of data signals in the plurality of data lines.

66. A computer program product in a computer readable medium for equalizing a transmission of data signals in a plurality of input channels in a device, the computer program product comprising:

first instructions for receiving a data signal form each of the plurality of input channels in the device and a reference signal;

second instructions for identifying a delay between a transition in the data signal and a transition in the reference signal on each channel of the plurality of input channels, based on a periodic timing reference to form a plurality of delays; and third instructions for using the plurality of delays to adjust a delay in a transmission of a data signal on each channel within the set of input channels to increase a setup and a hold time for the plurality of data signals.

* * * * *